Figure 1:
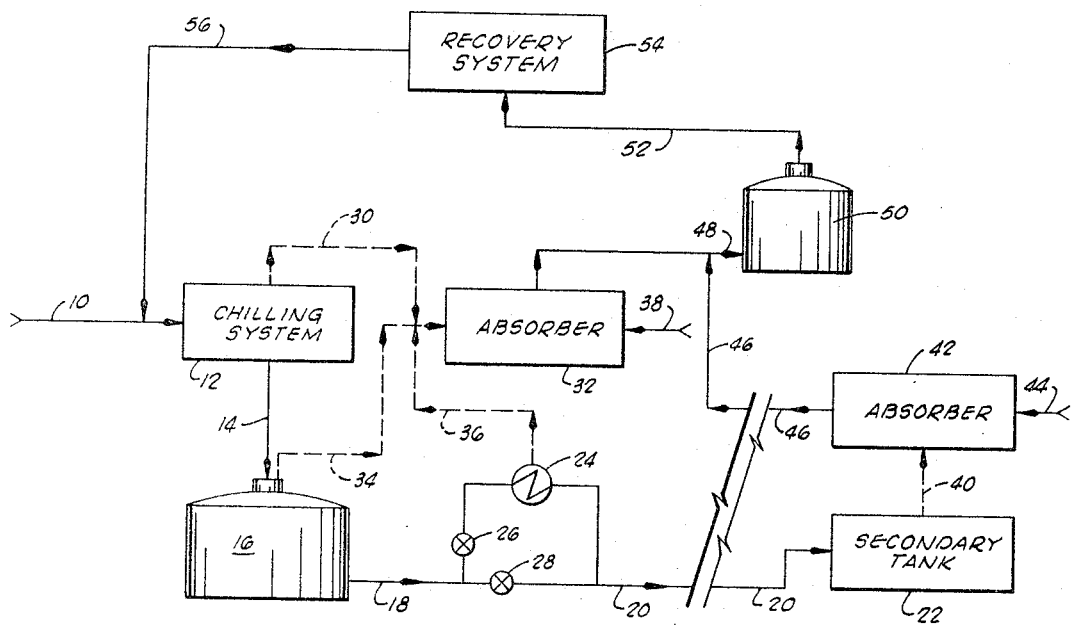

May 23, 1967

H. T. HASHEMI 3,320,756

METHOD OF STORAGE AND TRANSPORTATION OF LIQUIFIED GAS

Filed Dec. 6, 1965

2 Sheets-Sheet 1

INVENTOR.
HADI T. HASHEMI

BY
Dunlap and Laney
ATTORNEYS

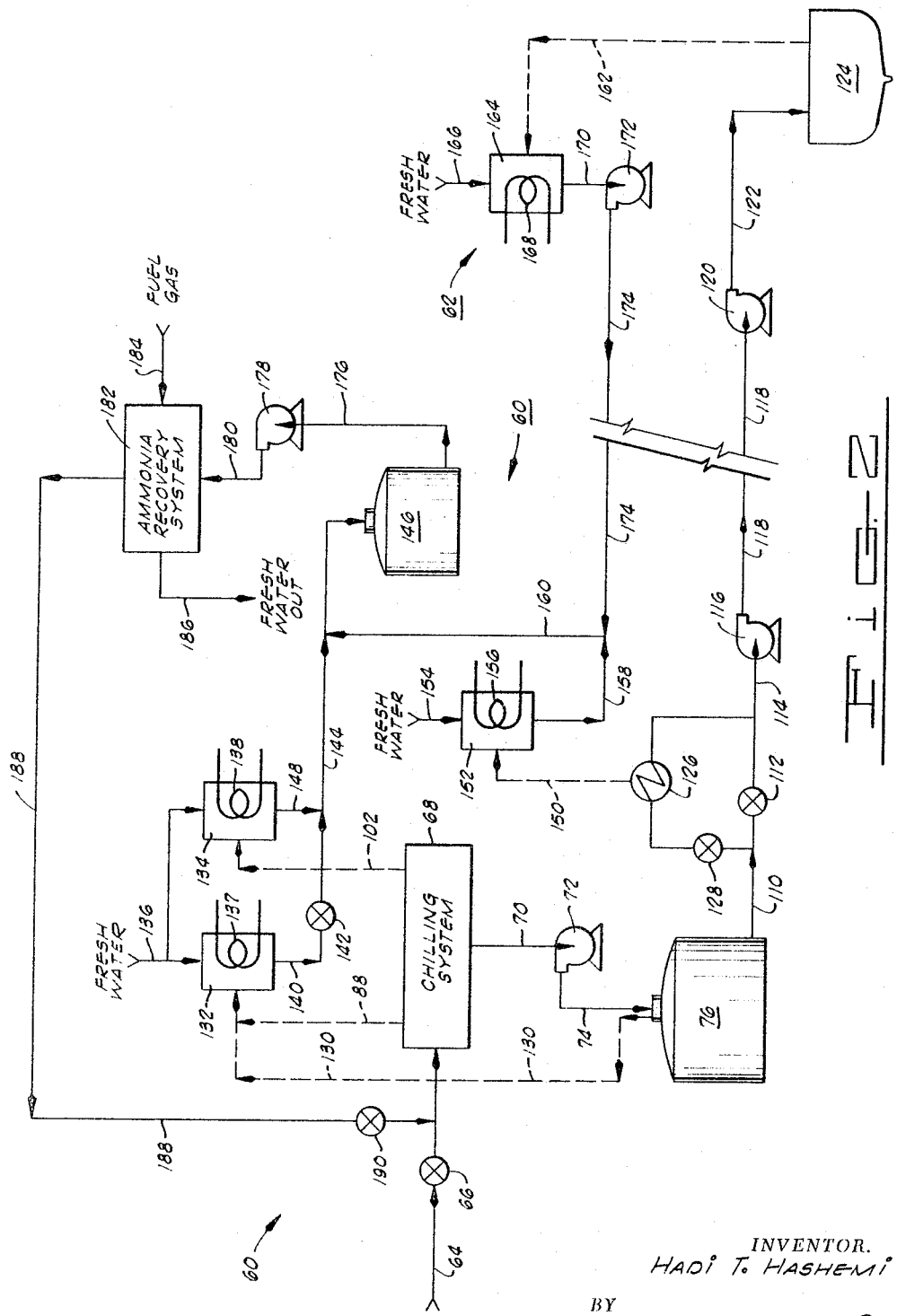

United States Patent Office 3,320,756
Patented May 23, 1967

3,320,756
METHOD OF STORAGE AND TRANSPORTATION OF LIQUIFIED GAS
Hadi Tafreshi Hashemi, Norman, Okla., assignor to University Engineers Inc., Norman, Okla., a corporation of Oklahoma
Filed Dec. 6, 1965, Ser. No. 512,276
12 Claims. (Cl. 62—45)

This invention relates generally, as indicated, to the storage and transfer of volatile liquified gas to secondary or other intermediate facilities; and more particularly, but not by way of limitation, it relates to a particular method for the storage and delivery of liquified ammonia gas to a terminal or ship loading facility.

The known processes for liquified gas handling deal with the problem of boil-off gas by recondensation and reinsertion into the main flow line or storage facility. These systems require large power expenditure for processing the boil-off gas since, in some cases, the boil-off rate is very high. This is particularly the case when loading the liquified gas through a transfer line to load a ship and it is especially true when the ship is tied or anchored out at a considerable distance from the storage tank. In general, these prior methods employ conventional compressional type refrigeration systems to continuously recover the boil-off gases immediately after they are produced; hence, there is a requirement for heavy, complex and expensive compression systems for processing large volumes of boil-off gas at the secondary storage site or terminal point of the loading line. When there are large distances between the storage tank and the pier or ship, the installation requires large equipment and an appreciable man power reserve for the operation of facilities which are only used intermittently for very short periods of time, e.g. during periodic shiploading operations.

The present invention contemplates a storage and transfer method which employs the operation of absorption to recover the boil-off vapors from the loading line as well as any boil-off vapors present at the storage site. More particularly, the present invention contemplates a storage site which may be located some distance from the pier or other cargo loading point, whereat the incoming or manufactured liquified gas at ambient temperatures is chilled to its atmospheric boiling point for storage in a large capacity storage tank. Cooling and pumping equipment is provided to transfer the liquified gas at its atmospheric boiling point to the remote secondary tank or ship cargo facility. The boil-off from all phases of the operation, that is, from the storage tank, the cooling apparatus and the secondary tank, is absorbed in a suitable absorbent for storage at the storage site. Thereafter, the stored solution may be processed at a reduced rate of processing to recover the liquified gas for re-introduction to the chilling system and storage tank.

Therefore, it is an object of the present invention to provide a method of storing and piping liquified gas in large quantities for a relatively great distance with the attendant advantage that boil-off vapors are centrally handled and reliquified to their pure form with a saving in man power and equipment expense.

It is also an object of the present invention to provide such a liquified gas storage and handling method wherein any boil-off gases absorbed may be easily transferred to a centrally located storage facility and thereafter recovered for addition into the main flow line of liquified gas.

Finally, it is an object of the present invention to provide a method of boil-off recovery from a liquified ammonia storage and ship loading facility which is intermittently operative to effect transfer of the liquified ammonia, by absorbing any boil-off vapors and thereafter storing them in the form of aqueous ammonia for recovery of the liquified gas at a reduced, continuous rate.

Other objects and advantages of the invention will be evident from the following detailed description when read in conjunction with the accompanying drawings which illustrate the invention.

Figure 3:
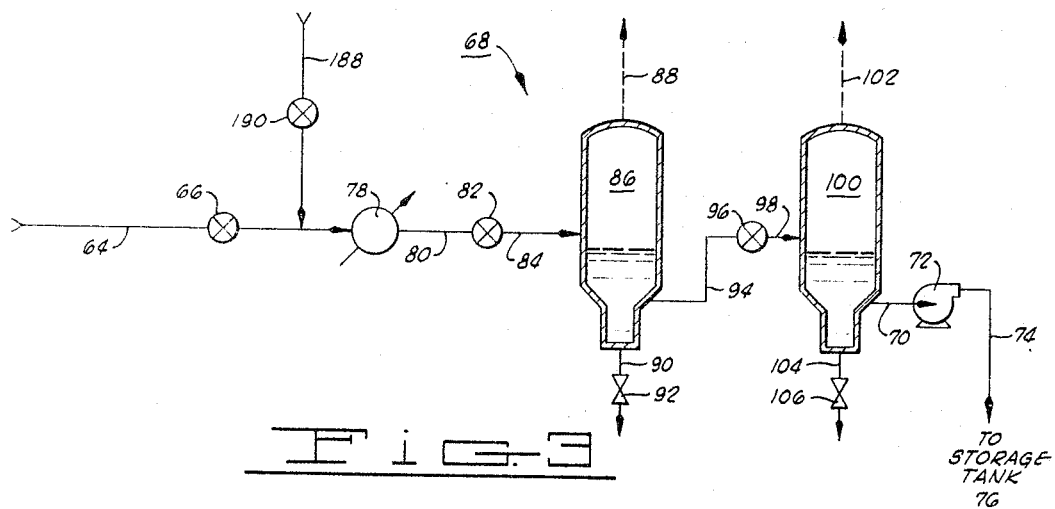

In the drawings:
FIG. 1 is a basic block diagram of the method for receiving and storing liquified gas for movement or transfer thereafter to a secondary tank or transport vessel;
FIG. 2 is a block diagram showing a method of receiving and storing liquified ammonia gas for periodic loading onto a ship; and
FIG. 3 is a block diagram of a liquid ammonia chilling system suitable for use in the equipment set up of FIG. 2.

The block diagram of FIG. 1 illustrates a method for handling boil-off vapors in a storage and loading facility. Employment of the method avoids large investment in equipment which is used only when the liquified gas is being supplied from storage, and it thereby circumvents the need for a complex compression system which would be used for handling large, variable boil-off vapor rates. The method is based upon the use of absorption of boil-off vapors by a suitable absorbent at either the storage or loading sites; storage of the absorbed gas solution for later processing, and continuous recovery and chilling of the pure liquified gas from the absorbed gas solution.

The initial processed or manufactured liquified gas would be supplied at the pipeline 10, probably at ambient temperature as it arrives from the production site. The pipeline 10 is lead into a chilling system 12 which may be a series of suitable flash drum stages for reducing the liquified gas temperature down to its atmospheric boiling point. Thereafter, the atmospheric boiling liquified gas is supplied through the pipe 14 into the storage tank 16. Storage tank 16 would be any of the conventional, insulated storage tanks which are commonly employed for the storage of liquid materials at low temperature.

A pipeline 18 then leads out of the storage tank 16 for use in supplying the liquified gas through the feeder pipeline 20 to the secondary tank 22. It is probable that the secondary tank 22 will be a ship or other transportation vessel and that the liquid gas transfer through feeder pipeline 20 will be carried out periodically for the loading operation. A subcooler assembly 24 is also located near the storage site for the purpose of subcooling the liquified gas to several degrees below its atmospheric boiling point prior to delivery through the feeder pipeline 20 to the secondary tank 22. This subcooler 24 is employed when the pipeline 20 is excessively long in order to further reduce boil-off vapors upon arrival of the gas at the secondary tank 22. Suitable valves 26 and 28 are shown for the purpose of showing alternate operation, either by-pass or not, of the subcooler assembly 24.

Due to the fact that heat leak will continually take place in all of the processing and storage equipment, boil-off vapors must be recovered from the various units. The dash lines indicate such recovery. A dash line 30 recovers all boil-off vapors from the chilling system 12 and supplies them to an absorber unit 32. Similarly, the line 34 conveys boil-off vapors from the storage tank 16 to absorber unit 32, while the line 36 provides similar boil-off recovery from the subcooler 24 when it is in operation. The absorber unit 32 may be any conventional type of absorber equipment commonly used in the chemical processing industry and it is supplied with a suitable absorbent as shown by the input line 38. In the case of liquified petroleum gases, there are various absorbent oils which could be used, while for liquified ammonia gas, fresh water is a preferred absorbent.

At the secondary tank 22, a boil-off recovery line 40 is provided to a second absorber unit 42 supplied with a suitable absorbent through the input line 44. The absorbed liquid gas in solution is then flowed or suitably pumped through the pipeline 46 back to the storage site for combination with the solutions recovered at that site and thereafter the recovery of the liquified gas. It should be understood that in some cases, as when the distance between storage tank 16 and secondary tank 22 is small, the boil-off vapor line 40 could be lead directly back to the absorber 32; however, for any appreciable distance of transfer it is preferable to return the boil-off vapor in solution since only a small pipeline is required. The absorbed gas from absorber 32 and absorber 42 (on pipeline 46) is then fed through a pipeline 48 into a storage tank 50 to await subsequent recovery processing. The absorbed gas solution may be withdrawn from tank 50 through pipeline 52 for application to a recovery system 54, a suitable stripping unit for removing the liquified gas from the absorbent and any other impurities. The stripper or recovery system 54 may be one of the well-known types of units, conventional in the chemical processing industry, and it need not have a large capacity since the absorbed gas in solution can await the recovery process while being stored in the storage tank 50. Thus, large intermittent rates of boil-off from the storage site and the secondary tank 22, which occur during the periodic loading operations, can be stored and recovered at a continuous and much reduced rate through the recovery system 54.

The liquified gas recovered in the system 54 is then supplied on a pipeline 56 at an ambient temperature for re-entry into the main flow line 10 and re-application to the chilling system 12 and subsequent storage in storage tank 16. Suitable valve and control apparatus (not shown) would be included in the flow line, including pipeline 56 and main pipeline 10, for regulating the flow as between the new and the recovered liquified gas. Other control valves (not shown), as well as suitable pump apparatus for providing the necessary flow pressure between stages or units of the equipment, would be provided in suitable manner as is well-known in the art.

The method as performed in FIG. 1 enables boil-off recovery from all units of the system by a centralized recovery system and the method is usable with transfer lines as long as seven miles or even more when adequate pump apparatus is supplied. That is, the liquid gas transfer pipeline 20 could be extended up to the seven mile length and the absorbed gas return line 46 would be no problem since it is a pipeline which is much reduced in diameter and not at all critical as to its capacity.

FIG. 2 shows the method as it would be employed for storage and ship loading of liquified ammonia gas. The storage site is designated by the numeral 60 while the numeral 62 denotes the loading site which may be a suitable pier, barge or whatever and which may be located some distance from the storage site 60. The liquified ammonia gas is received at the pipeline 64 from the production or prior processing plant (not shown). In many instances, it may be feasible for the storage site 60 to be located at or near the plant battery limits since the method allows for extended transfer lines while still providing for recovery of all boil-off vapors.

The liquified ammonia gas at ambient temperature is received in pipeline 64 through a control valve 66 into a suitable chilling system 68. The liquified ammonia gas in line 64 arrives at an ambient temperature between 100 and 125 degrees Fahrenheit; whereupon the chilling system 68 reduces the temperature to minus 28 degrees Fahrenheit for subsequent storage. The liquified ammonia gas at minus 28 degrees Fahrenheit is then applied through pipeline 70 to a suitable pump 72, and then through line 74 into the insulated storage tank 76.

FIG. 3 shows an expanded diagram of the chilling system 68, like components such as piping and valving being similarly designated. The chilling system 68 consists of a first pre-cooler 78 of the conventional water cooler type. The purpose of the pre-cooler 78 is to reduce the temperature of the incoming liquid ammonia to, typically, 100 degrees Fahrenheit if it happens to be at a greater temperature. This thereby reduces the power requirement of the process which would be increased whenever the incoming liquid exceeded 100 degrees Fahrenheit. The pre-cooled liquid in pipe 80 is directed through control valve 82 and lead in pipe 84 where it is applied to a first flash stage 86. The flash stage 86 is maintained at a pressure of, for example, 58.5 pounds per square inch atmosphere (hereafter termed p.s.i.a.) and the temperature of the condensate liquid leaving this flash drum is about 29 degrees Fahrenheit. Boil-off vapors are conveyed through pipeline 88, as will be described, and a suitable bleed-off line 90 and valve 92 are provided for the drainage of oil or other impurities which may be present in contamination of the liquid gas.

The liquid ammonia gas at 29 degrees Fahrenheit is lead from the first flash stage 86 through a conduit 94 and control valve 96 to the input conduit 98 which leads to a second flash stage 100. The second flash stage 100 operates in a manner similar to the first flash stage 86 and accepts the 29 degree Fahrenheit liquid ammonia and, after the flashing process, provides liquid ammonia gas at 14.3 p.s.i.a. and minus 28 degrees Fahrenheit. This condensate then flows through line 70, pump 72 and line 74 to the storage tank 76. The second flash stage 100 has a similar boil-off vapor collection line 102, as well as a bleed-off line 104 and valve 106 for further separation of any impurities. The flash stages 86 and 100 would also be provided with effective de-aeration facilities, probably of the continuous type, as are well-known in the art but not specifically shown here.

Referring again to FIG. 2, the chilled liquid ammonia gas present in pipelines 70 and 74 is then applied to a suitable, insulated storage tank 76. The storage tank 76 may be a conventional type of double wall, flat bottom tank which is suitably insulated by the inclusion of a floor formed of low density cement and wall and roof insulation consisting of perlite, Fiberglas or other well-known equivalents which serve to keep heat leak at a minimum.

The liquified ammonia gas stored in storage tank 76 at its atmospheric boiling point of minus 28 degrees Fahrenheit is then available for transfer on the conduit 110 through control valve 112 and conduit 114 to a suitable transfer pump 116 (and a succession of transfer pumps thereafter as needed) for flow to the terminal or loading point 62. That is, the transfer line is shown extended with a conduit 118, second transfer pump 120 and the load line 122; however, it should be understood that the number of transfer pumps will be dependent upon the distance from the storage tank 76 (at storage site 60) to the loading site 62 where a suitable vessel 124 is to be loaded with liquid ammonia gas from the load line 122.

A subcooler unit 126 is again provided at storage site 60 for the purpose of further reducing any boil-off which should occur at the loading site 62 from the vessel 124. A control valve 128 allows the atmospheric boiling liquid ammonia to be by-passed through the subcooler unit 126, of conventional type, whereupon it is cooled an additional three or four degrees Fahrenheit, for example, for re-entry to the transfer line 114 and the succeeding transfer pump lines to the load line 122 and, finally, the vessel 124. When employing the subcooling by-pass, the liquid ammonia gas starts out on the transfer line at several degrees below its atmospheric boiling point and, after heat leaks through the transfer line 118 and the multiple transfer pumps 116, 120, etc., it will arrive at the vessel 124 at its atmospheric boiling temperature of minus 28 degrees Fahrenheit, that temperature which is suitable for storage and transportation.

As can be seen by the dotted lines at the storage site 60, various of the system units produce boil-off vapor which must be recovered. Thus, boil-off from storage tank 76 is collected and conveyed on a conduit 130 to an absorber unit 132. In chilling system 68, the boil-off vapor from the first flash stage 86 (see FIG. 3) is carried through conduit 88 to the input of absorber 132 and the boil-off vapor from the second flash stage 100 is led through conduit 102 to a second or parallel absorber unit 134. The absorber units 132 and 134 are of conventional variety employing fresh water, applied in through the pipe 136, as an absorbent and utilizing a suitable coolant such as cold water through the internal coil system 137 and 138, respectively. Aqueous ammonia is then collected from absorber 132 through conduit 140 and valve 142 to be lead through pipe 144 for storage in an aqueous ammonia storage tank 146. Similarly, the aqueous ammonia recovered from the absorber 134 is available through conduit 148 and pipe 144 to the aqueous ammonia storage tank 146.

The subcooler unit 126 also produces a quantity of boil-off vapor which is conveyed on pipeline 150 to another absorber unit 152. The absorber unit 152 is another of the similar design with fresh water absorbent input at line 154 and suitable coolant applied through the internal coils 156. The absorbed solution or aqueous ammonia is then available on pipe 158 to conduit 160 and load pipe 144 to the aqueous ammonia storage tank 146. It should be understood that the various fresh water and coolant supplies for the absorbers 132, 134 and 152 at the storage site 60 would preferably be centralized such that a single recirculating plant would provide a common source.

At the loading site 62, boil-off vapors from the vessel 124 are lead through the line 162 to still another similar type of absorber unit 164 utilizing fresh water as applied through pipe 166 and coolant present in coils 168. The aqueous ammonia from absorber 164 is then lead through a pipe 170 to a suitable transfer pump 172, whereupon it is pumped over a long return pipe line 174 to the conduits 160 and 144 to the aqueous ammonia storage tank 146.

The aqueous ammonia in storage tank 146 can then be held for further recovery processing. The aqueous ammonia is flowed through pipe 176, pump 178 and lead-in pipe 180 to an ammonia recovery system 182. The ammonia recovery system 182 may be any one of the conventional types of stripping processers having the required capacity; the stripper indicated here being one of the variety employing fuel gas as applied through input lead 184. The extracted fresh water is lead out through pipe 186 for disposal or, preferably, reuse at the storage site 60. Liquified ammonia gas at the proper ambient temperature is then available through the output conduit 188; whereupon adjustment of the control valve 190 will enable reapplication of the recovered liquified ammonia gas for re-entry into the main flow line 64 to the chilling system 68.

In performing the method, it is assumed that the shipboard reliquefaction unit aboard the vessel 124 is only sufficient for recondensing the boil-off vapors which occur due to heat leak of the cargo tanks. This is the usual situation in order to minimize shipboard equipment and therefore excessive weight. It is also preferable in performing the operation that the contents of the storage tank 76 be continuously circulated for a period of several days prior to the ship's arrival so that the bulk of the stored liquid is at the saturation temperature of minus 28 degrees Fahrenheit. Otherwise the rate of boil-off during loading operation may possibly get to be excessive, especially if the transfer line is long.

Liquid ammonia at a pressure of about 275 p.s.i.a. and at an ambient temperature of 100 to 125 degrees Fahrenheit (for example) is available through the pipeline 64 and control valve 66 into the chilling system 68, located at the storage site 60. The production plant or other source supplying the pipeline 64 will probably have a constant daily rate of production and supply, for example, between 600 and 1000 metric tons per day. The internal pressure of pipeline 64 should always exceed the vapor pressure of anhydrous ammonia at the expected maximum ambient temperature. This prevents liquid ammonia from boiling in the line to form an excessive volume of vapor, thereby limiting the capacity of the line, and it also avoids the necessity for recompressing the vapors at a later point. It has been found that a pressure of 275 p.s.i.a. minimum will give adequate protection against such short-comings in the expected applications of the method.

As previously described, the chilling system 68 reduces the liquified ammonia gas to its atmospheric boiling point of minus 28 degrees Fahrenheit, an optimum storage temperature. This liquified ammonia is then transferred through conduits 70 and 74 to the storage tank 76. It should also be understood that a plurality of storage tanks 76 connected in parallel to receive the chilled liquid ammonia from pipeline 74 would be preferable in an operational set up. It is also preferable that liquid ammonia from a suitable source at storage site 60 be sprayed into the upper regions of the storage tanks through a spray nozzle for the purpose of maintaining positive pressure in the storage tanks 76 despite any abrupt increases in the surrounding barometric pressure. This produces sufficent vapor to maintain a positive pressure in the tank, but avoids bringing warm gaseous ammonia into the storage tank 76.

The stored liquid ammonia in storage tank 76 is then available for periodic transfer through the transfer lines consisting of output conduit 110, conduits 114, 118 and load line 122, under the power of a proper number of transfer pumps (for example, transfer pumps 116 and 120) for eventual loading into a transport vessel 124. The vessel 124 may be located a considerable distance from the storage site 60, or it may be located relatively close to storage site 60; it being understood that the problem of boil-off is increased with an increase in the length of the transfer line. That is, the longer the transfer line and the more pumps which must be employed to move the liquid ammonia from the storage tank 76 to the vessel 124, the greater will be the heat leak along the line and therefore the boil-off at the vessel 124. Thus, in the case of long loading lines the subcooler 126 is employed to reduce the temperature of the liquid ammonia gas several degrees below its atmospheric boiling point so that it will be relatively stable upon its arrival at the vessel 124. The amount or number of degrees of subcooling will depend upon the heat leak of the transfer line and the distance of the vessel 124 from the storage site 60.

Boil-off from the vessel 124 is recovered through line 162 and passed into an absorber unit 164 where it is dissolved in fresh water absorbent to form aqueous ammonia. This aqueous ammonia is then capable of easy and reliable piping through a conduit 174 of non-critical size back to the storage site 60 for retaining in an aqueous ammonia storage tank 146. The boil-off from the storage tank 76, chilling system 68 and the subcooler 126 is also processed in absorber units 132, 134 and 152 (or equivalent combinations of the same) to form aqueous ammonia for storage in the aqueous ammonia storage tank 146. The stored aqueous ammonia is then supplied through pump 178 and input conduit 180 to the ammonia recovery system 182, fueled by gas on line 184, to extract the fresh water and provide anhydrous ammonia at a suitable ambient temperature and the proper pressure for application on pipeline 188 back to the main flow line for re-entry into the chilling system 68.

It should be understood here that absorption to handle the total bulk of the high rate of boil-off during a ship loading operation would probably not be feasible due to the great amount of equipment, fuel and fresh water expenditure required. However, the absorption and producion of aqueous ammonia for storage allows the aqueous ammonia to be processed at a much less rapid rate, but continuously, such that the large intermitten rates of boil-off from a loading operation are averaged out over a long period of continuous ammonia recovery processing. While on the one hand, the transfer line from storage tank 76 to the vessel 124 must be made to flow at a high rate with critical insulation and pump characteristics, the recovery of any boil-off vapor from the vessel 124 is carried out by producing aqueous ammonia for storage and later recovery.

Simple absorption chambers can be employed to carry out the function of producing aqueous ammonia. For example, at atmospheric pressure and 100 degrees Fahrenheit, the equilibrium concentration of ammonia in water is about 24 weight percent. Thus, for each pound of boil-off vapor, a minimum of approximately 3.5 pounds of fresh water is needed. Thus, for a situation where the ammonia vapor leaves the ship at a rate of 20,000 pounds per hour, an absorption unit only requires 140 gallons per minute of fresh water and a 3 inch return line to convey the aqueous ammonia back to storage at the storage site 60 (the aqueous ammonia storage tank 146).

The foregoing sets forth a method of storing and handling volatile liquified gas, especially the storage and handling of liquified ammonia, whereby the problems attendant long ship loading lines are largely overcome, and, in addition, a great savings in man power and equipment expenditure is effected. The system utilizes simple absorption techniques for combatting boil-off vapors both at the storage site and at the remote ship or secondary tank site, and therefore avoids the excessive equipment outlay and man power which is required with the various recompression and condensation systems which are used for recovering boil-off vapors. In addition to ammonia handling, it is foreseen that the method and apparatus may serve equally well in applications treating natural gas and other volatile hydrocarbons, such as methane, butane and the like.

Changes may be made in the combination and arrangement of steps and elements as heretofore set forth in this specification and shown in the drawings; it being understood, that changes may be made in the embodiments disclosed without departing from the spirit and scope of the invention as defined in the following claims.

What is claimed is:

1. A method of storing and handling liquified gas at a storage and transportation terminal facility, comprising the steps of:
   receiving the liquid gas through a main supply line at ambient temperature and chilling the liquified gas to its atmospheric boiling point;
   storing said atmospheric boiling liquified gas in an insulated container;
   pumping the liquified gas from the storage tank to a transportation or secondary storage facility;
   absorbing the boil-off gas from the chilling system, the storage tank, and the transportation or secondary storage facility, and storing the total volume of absorbent in an absorbent tank; and
   recovering the liquified gas at ambient temperature from said stored absorbent liquid for addition back into the received main supply line of liquified gas for rechilling and storage.

2. A method as set forth in claim 1 wherein an appreciable distance separates the storage tank and the transporting or secondary tank, comprising the further steps of:
   pumping the atmospheric boiling liquified gas through a relatively large transfer line to the transport or secondary storage tank;
   absorbing boil-off gas from the transport or secondary storage facility at that location and pumping the absorbent liquid back to the absorbent liquid tank at the terminal facility through a smaller transfer line for subsequent recovery of the liquid gas at ambient temperature for addition into the main line received into the chilling system.

3. The method as set forth in claim 2 which is further characterized to include the steps of:
   subcooling the atmospheric boiling liquid upon withdrawal from the storage tank such that after piping to the transportation or secondary storage facility the attendant heat leak of the transfer line will deliver the liquified gas at its atmospheric boiling point at the transportation or secondary storage facility.

4. A method of storing and handling liquified ammonia at a transportation terminal facility comprising the steps of:
   receiving the liquified ammonia gas at an ambient temperature from a production or primary source;
   chilling the liquid ammonia to its atmospheric boiling point and transferring the liquid gas into an insulated storage container;
   supplying the atmospheric boiling liquid ammonia from the storage tank to other transport or secondary tanks;
   recovering the boil-off gas from the transport or secondary storage tanks, the chilling system, and from the storage tank, and absorbing the boil-off to yield aqueous ammonia; and
   passing the aqueous ammonia through an ammonia recovery system to derive the anhydrous liquid ammonia at ambient temperature and thereafter charging said anhydrous liquid ammonia into the main line for reapplication to the chilling system.

5. A method as set forth in claim 4 wherein the transport or secondary storage tank is remotely located from the storage tank comprising the further steps of:
   pumping the atmospheric boiling liquid ammonia through a large line for delivery to the transport or secondary storage tank;
   recovering the boil-off from the transport or secondary storage tank and absorbing the boil-off to form aqueous ammonia at the site of the transport or secondary storage tank; and
   transporting the absorbed aqueous ammonia through a smaller transfer line back to the aqueous ammonia storage tank at the terminal facility for ammonia recovery and reapplication to the chilling system.

6. A method as set forth in claim 5 which is further characterized to include the steps of:
   subcooling the liquid withdrawn from the storage tank a number of degrees in proportion to the distance to be piped such that the liquid ammonia arriving at the transport or secondary storage tank is at its atmospheric boiling temperature.

7. A method of storing and handling liquified ammonia wherein liquified ammonia from a production plant is stored for periodic loading onto a ship where the ship loading position may be at some distance from the storage tank, comprising the steps of:
   receiving the liquid ammonia at ambient temperature and chilling the liquid ammonia to its atmospheric boiling point for application to a storage container insulated to exhibit minimal heat leak;
   subcooling the stored liquid ammonia for transfer through a pipeline to the ship storage facility;
   recovering the vapor boiled off from the ship storage facility and applying it to an ammonia absorber to form aqueous ammonia and transferring said aqueous ammonia to an aqueous ammonia storage tank located near the storage tank;
   recovering the boil-off from the chilling system, the subcooler, and the storage tank and processing this recovery through ammonia absorbers to form additional aqueous ammonia which is also transfered to said aqueous ammonia storage tank;
   processing the stored aqueous ammonia in an ammonia recovery system to derive anhydrous liquid ammonia at ambient temperature for charging into the main line for rechilling and storage.

8. A method as set forth in claim 7 wherein the aqueous ammonia storage tank and the ammonia recovery system have such capacity that they can be continuously operated at reduced volume to process large intermittent rates of boil-off ammonia vapor.

9. A system for the storage and handling of liquified gas including a storage site and a remotely located loading or secondary storage site, comprising:
   a main flow line delivering liquid gas at ambient temperature;
   chilling means connected to said main flow line for reducing the liquid gas to its atmospheric boiling point;
   heat insulated storage means for storing said liquid gas at its atmospheric boiling point;
   a transfer line including pump means for delivering liquid gas from said storage means to said remote loading site;
   absorption means at said loading site for recovering boil-off vapors by dissolution with an absorbent;
   means for pumping the absorbent and absorbed vapor from the loading site to the terminal site; and
   means for recovering the absorbed vapor from the absorbent at the storage site and returning the recovered vapor for rechilling and storage as liquified gas.

10. A system as set forth in claim 9 which is further characterized to include:
    additional absorption means located at said storage site for absorbing all boil-off vapor from said chilling means and said storage means by dissolution with an absorbent; and
    means for pumping said absorbent containing boil-off vapor from said chilling means and storage means to said means for recovering the absorbed vapor.

11. A system as set forth in claim 9 which is further characterized to include:
    subcooler means connected in said transfer line near said means for storing for subcooling the liquified gas to several degrees below its atmospheric boiling point prior to flow through said transfer line.

12. A system for transferring liquified gas from a storage terminal site where the gas is stored at about its atmospheric boiling point to a remotely located loading site, comprising:
    means for pumping the liquified gas to the loading site comprising;
    a storage tank containing the liquified gas at its atmospheric boiling point;
    a transfer pipeline leading from the storage tank to the loading site;
    transfer pump means for forcing the liquid gas through said transfer pipeline; and
    subcooler means located near the storage tank and connected into the transfer pipeline to subcool the liquid gas by a number of degrees sufficient to account for heat leak along the transfer pipeline so that the liquid gas arrives at the loading site at its atmospheric boiling point of temperature,
    means for absorbing the boil-off vapor at the loading site;
    means for pumping the absorbent and absorbed vapor from the loading site to the terminal site; and
    means for recovering the absorbed vapor at the terminal site and returning the recovered vapor to storage.

References Cited by the Examiner

UNITED STATES PATENTS

| | | | |
|---|---|---|---|
| 2,001,996 | 5/1935 | Whitman | 62—54 |
| 2,059,942 | 11/1936 | Gibson | 62—54 X |
| 2,246,875 | 6/1944 | Carney | 62—54 X |
| 2,901,403 | 8/1959 | Adams et al. | 62—48 X |
| 3,068,657 | 12/1962 | Allen | 62—48 |

LLOYD L. KING, *Primary Examiner.*